(12) United States Patent
Hasegawa

(10) Patent No.: US 7,958,798 B2
(45) Date of Patent: Jun. 14, 2011

(54) SPEED CHANGE SYSTEM FOR WORKING VEHICLE

(75) Inventor: Toshiyuki Hasegawa, Amagasaki (JP)

(73) Assignee: Kanzaki Kokyukoki Mfg. Co., Ltd., Hyogo (JP)

(*) Notice: Subject to any disclaimer, the term of this patent is extended or adjusted under 35 U.S.C. 154(b) by 640 days.

(21) Appl. No.: 12/037,681

(22) Filed: Feb. 26, 2008

(65) Prior Publication Data

US 2008/0214356 A1    Sep. 4, 2008

(30) Foreign Application Priority Data

Feb. 26, 2007   (JP) ................................. 2007-046026

(51) Int. Cl.
*F16H 3/08*    (2006.01)

(52) U.S. Cl. .......................................... 74/325; 74/331
(58) Field of Classification Search .................. 74/325, 74/331
See application file for complete search history.

(56) References Cited

U.S. PATENT DOCUMENTS

| | | | | |
|---|---|---|---|---|
| 2,972,899 | A * | 2/1961 | Wiggermann | 74/329 |
| 3,897,699 | A * | 8/1975 | Hoyer | 74/745 |
| 5,301,564 | A * | 4/1994 | Muller et al. | 74/333 |
| 5,407,042 | A * | 4/1995 | Fukui et al. | 192/3.58 |
| 6,491,604 | B1 * | 12/2002 | Katou et al. | 477/154 |
| 6,851,328 | B2 * | 2/2005 | Umemoto et al. | 74/335 |
| 6,918,850 | B2 * | 7/2005 | Hasegawa et al. | 475/72 |
| 2003/0226416 | A1 | 12/2003 | Umemoto et al. | |
| 2008/0214348 | A1 * | 9/2008 | Hasegawa et al. | 475/80 |

FOREIGN PATENT DOCUMENTS

| | | |
|---|---|---|
| EP | 0 797 025 B1 | 10/2001 |
| JP | 58-132245 | 8/1983 |
| JP | 59-149524 | 8/1984 |
| JP | 2-195050 | 8/1990 |
| JP | 2003-314679 | 11/2003 |

OTHER PUBLICATIONS

European Search Report and Opinion for European Application No. EP 08 00 3272, dated Mar. 23, 2010, 6 pgs.

* cited by examiner

*Primary Examiner* — Tisha D Lewis
(74) *Attorney, Agent, or Firm* — Sterne, Kessler, Goldstein & Fox, P.L.L.C.

(57) ABSTRACT

A speed change system for a working vehicle comprises a main transmission, a sub transmission and a preliminary transmission. The main transmission receives a prime mover power outputted from a prime mover, and has plural main speed stages, one of which is selected to transmit the prime mover power. The sub transmission is disposed on the downstream of the main transmission, and has plural sub speed stages, one of which is selected to transmit a power from the main transmission. The preliminary transmission is disposed on the upstream of the main transmission, and has plural preliminary speed stages, one of which is selected to transmit the prime mover power to the main transmission. An operation for selecting one of the preliminary speed stages can be performed during traveling of the working vehicle.

8 Claims, 5 Drawing Sheets

SPEED CHANGE SYSTEM FOR WORKING VEHICLE

BACKGROUND OF THE INVENTION

1. Field of the Invention

The present invention relates to a speed change system for a working vehicle comprising a multistage transmission which changes the speed of prime mover power outputted from a prime mover among plural speed stages.

2. Related Art

As disclosed in JP 2003-314679 A, there is a well-known speed change system used for a working vehicle such as a tractor that has a multistage main transmission comprising a plurality of gear trains. In this speed change system, to improve the speed change operability of the main transmission, the main transmission includes two mechanical clutches such that, during the speed change operation, the engaging action of one clutch overlaps the disengaging action of the other clutch so as to realize a double clutch-engaging state. This allows an operator to shift gears without interrupting the transmission of rotary power from a prime mover, such as an engine or an electric motor, to an axle, thereby reducing the shock and noise caused by the gearshift.

To enable a wide range of speeds—from low speeds suitable for activities such as forming a ridge to high speeds suitable for traveling—the working vehicle includes a sub transmission in addition to the main transmission so as to increase the number of speed stages. In other words, multiple speed stages are enabled by the combination of the main transmission and the sub transmission, thereby ensuring the ability to fine-tune speed changes over a broad range of speeds. However, the speed change operation of the sub transmission cannot be performed during traveling of the working vehicle; it can be performed only when the working vehicle is stationary. While the working vehicle is stationary, an operator selects the sub speed stage suitable for the work to be performed. After that, the operator operates a brake and an accelerator pedal so as to start the working vehicle. Then, during the traveling of the vehicle, one of the main speed stages suitable for the vehicle speed, i.e., the actual traveling speed of the vehicle, is selected manually or automatically.

Accordingly, while the working vehicle travels at a set speed stage, if an operator desires fine-tuned speed change, the operator can shift up or down the main speed stage by a main speed change operation, while still operating within the same sub speed stage. While still traveling, an operator cannot effect more significant speed changes by selecting other speed stages that depend on the sub speed change operation. To achieve a more significant speed change by selecting a speed stage depending on the sub speed change operation, the working vehicle must be stopped, thereby reducing the operability for speed change, causing frequent start and stop of the vehicle and worsening fuel economy.

SUMMARY OF THE INVENTION

An object of the present invention is to provide a speed change system for a working vehicle, comprising a multistage main transmission and a sub transmission disposed on the downstream of the main transmission, wherein, during traveling of the working vehicle, speed change can be performed more precisely than when depending on only the main speed change operation of the main transmission.

To achieve that object, according to the present invention, a speed change system for a working vehicle comprises a main transmission, a sub transmission disposed on the downstream of the main transmission, and a preliminary transmission disposed on the upstream of the main transmission. The main transmission receives a prime mover power outputted from a prime mover, and has plural main speed stages, one of which is selected to transmit the prime mover power to the sub transmission. The sub transmission has plural sub speed stages, one of which is selected to transmit a power from the main transmission. The preliminary transmission h as plural preliminary speed stages, one of which is selected to transmit the prime mover power to the main transmission. An operation for selecting one of the preliminary speed stages can be performed during traveling of the working vehicle.

Accordingly, during traveling of the working vehicle, one speed stage can be selected among those enabled by the combination of the main transmission and the preliminary transmission. Thus, more speed stages are available than otherwise would be the case when depending on only the main transmission's speed change operation. In this way, the speed ratio of the speed change system can be changed in correspondence to the traveling speed of the working vehicle more precisely than that when depending on only the main speed change operation. Therefore, it is not necessary to stop the working vehicle for the sub speed change operation, whereby incidences of selecting a desired speed stage of the entire speed change system are reduced. This improves the operability of the speed change and improves fuel economy by reducing the frequency of starts and stops of the vehicle.

Preferably, the main transmission comprises a first clutch for odd-numbered main speed stages and a second clutch for even-numbered main speed stages. When a speed-shift between one of the odd-numbered main speed stages and one of the even-numbered main speed stages is selected, one of the first and second clutches is disengaged, and the other of the first and second clutches is engaged, so that the disengagement action of the one clutch and the engagement action of the other clutch overlap each other.

Due to the clutch operation, the transmission of power from the prime mover to a drive axle of the vehicle is uninterrupted so as to improve the power transmission efficiency while keeping the appropriate speed change operability.

Further preferably, the preliminary transmission includes a first preliminary output drive train drivingly connected to the first clutch and a second preliminary output drive train drivingly connected to the second clutch. Both of the first and second preliminary output drive trains are simultaneously driven at the selected preliminary speed stage.

When the preliminary transmission is activated, the output power of the preliminary transmission is transmitted to respective input sides of both of the first and second clutches through the respective first and second preliminary output drive trains. Therefore, when one of the first and second clutches is engaged, and the other disengaged, so as to change the main speed stage, the output power of the preliminary transmission continues to be transmitted to the input sides of both of the first and second clutches without interruption, thereby ensuring smooth speed-shift of the main transmission.

Preferably, low and high speed stages serve as the plural preliminary speed stages. Even when only two speed stages are provided as the preliminary speed stages, the preliminary transmission and the main transmission can provide a sufficient number of speed stages (i.e. the twice of the number of the main speed stages) so as to ensure a sufficiently precise speed change effect. Further, the preliminary transmission can be miniaturized.

Preferably, a reverser is disposed on the upstream of the main transmission in parallel to the preliminary transmission, so that the preliminary transmission and the reverser are alternatively capable of transmitting the prime mover power to the main transmission.

Therefore, the vehicle can be subjected to the effects of the speed-changes of the main transmission and the sub transmission regardless of whether the vehicle travels forward or backward. However, the vehicle can be subjected to the effect of the speed-change of the preliminary transmission among the preliminary speed stages only when the reverser is set to prevent the prime mover power from being transmitted through it to the main transmission. In other words, the speed-change operation of the preliminary transmission can be performed only when the reverser is set for forward traveling of the vehicle.

Alternatively, preferably, a reverser is interposed between the preliminary transmission and the main transmission, and has a forward-driving drive train and a backward-driving drive train, one of which is selected to transmit an output power of the preliminary transmission to the main transmission.

Therefore, the vehicle can be subjected to the effect of the speed-change of the preliminary transmission among the preliminary speed stages regardless of whether the reverser is set for forward traveling or for backward traveling. In other words, the vehicle can be speed-changed equally well due to the main transmission and the preliminary transmission regardless of whether it travels forward or backward.

Preferably, the speed change system can be set into an auto operation mode where one of the main speed stages and one of the preliminary speed stages are automatically selected in correspondence to an actual traveling speed of the working vehicle.

Accordingly, after starting the vehicle and during traveling, an operator does not have to manually select the main speed stage or the preliminary speed stage, thereby improving the operability of speed change.

Preferably, the speed change system further comprises an input shaft and plural transmission shafts. The input shaft is provided for transmitting the prime mover power to the preliminary transmission. The plural transmission shafts are disposed on a power train from the preliminary transmission to the sub transmission through the main transmission. The transmission shafts are aligned on a substantial circle centered on the input shaft.

Accordingly, components of the preliminary, main and sub transmissions, such as gears, are provided on the transmission shafts to be concentrated around the input shaft so as to compact the speed change system.

These, other and further objects, features and advantages of the invention will appear more fully from the following description taken in connection with the accompanying drawings.

DETAILED DESCRIPTION OF THE INVENTION

Figure 1:
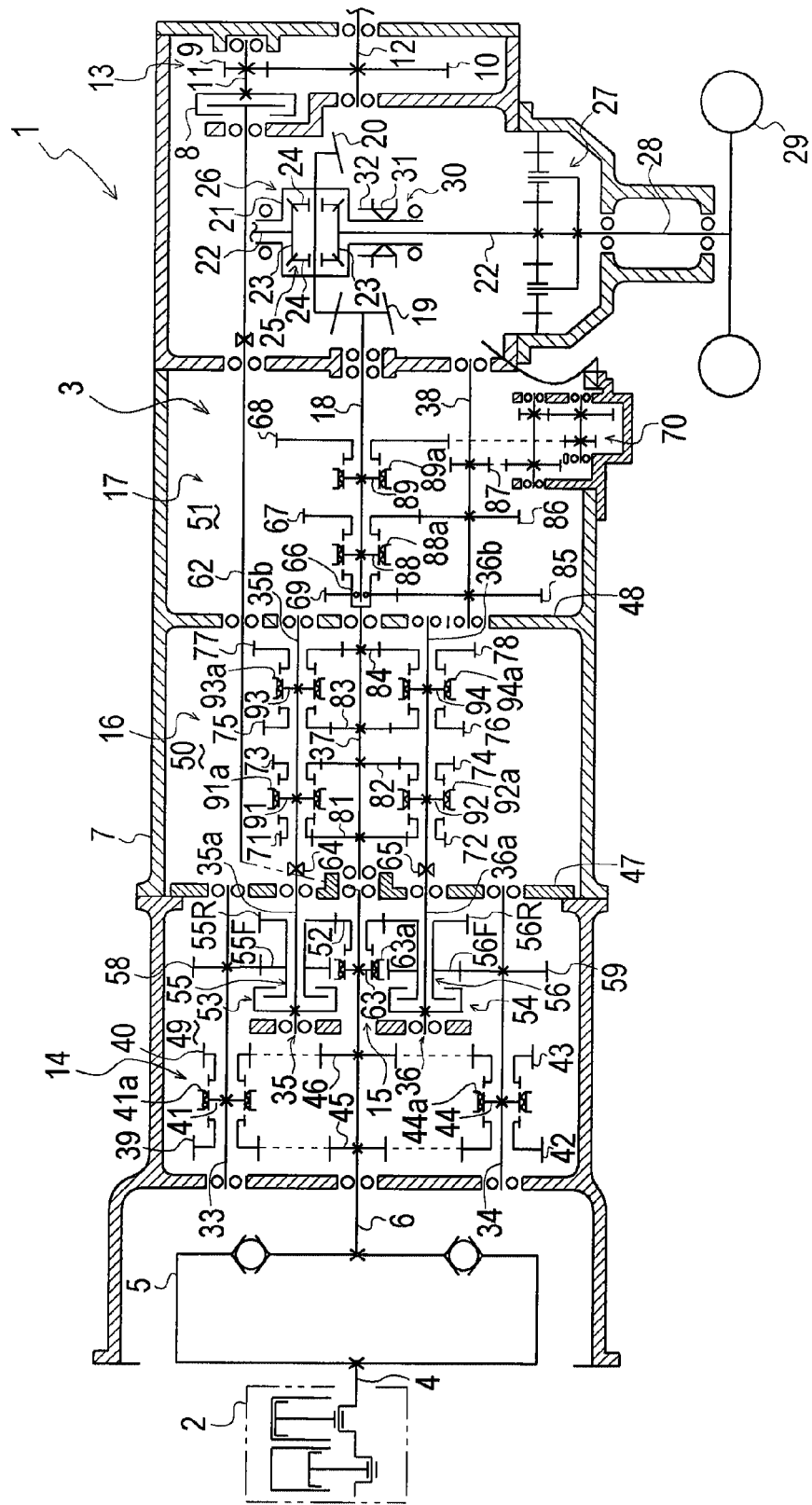
FIG. 1 is a skeleton diagram of an entire construction of a working vehicle equipped with a speed change system according to the present invention.

The general structure of a working vehicle 1 equipped with a speed change system according to the present invention will be described, with reference to FIGS. 1 and 2. The working vehicle 1 is a four-wheel drive agricultural tractor equipped with a prime mover 2, such as an engine or an electric motor, and a transmission apparatus 3 serving as the speed change system for speed change of a power from the prime mover 2 (hereinafter, the power is referred to as "prime mover power"). An output shaft 4 of the prime mover 2 is fixed to a flywheel 5, and the flywheel 5 is fixed through a damper to an input shaft 6 of the transmission apparatus 3.

The transmission apparatus 3 includes a transmission casing 7. The inner space of the transmission casing 7 is divided into a first chamber 49 and a second chamber 50 behind the first chamber 49 by a partition wall 47, and is divided into the second chamber 50 and a third chamber 51 behind the second chamber 50 by a partition wall 48. In the transmission casing 7, the input shaft 6 is extended rearward so as to serve as a common input shaft of a later-discussed preliminary transmission 14 and a later-discussed reverser 15 in the first chamber 49. The input shaft 6 is extended rearward through the partition wall 47 and is rotatably integrally connected to a coaxial PTO clutch input shaft 62 through a spline collar 61 in the second chamber 50, as shown in FIG. 2. The PTO clutch input shaft 62 is extended rearward through the second and third chambers 50 and 51, and is connected to a PTO clutch 8 at a rear end thereof in a chamber behind the third chamber 51. The PTO clutch 8 is a hydraulic multi-friction disc type clutch, for example. In a rear portion of the transmission casing 7, a PTO clutch output shaft 11 is extended from the PTO clutch 8 opposite to PTO clutch input shaft 62. A PTO shaft 12 is extended in parallel to the PTO clutch output shaft 11 in the transmission casing 7, and projects rearwardly outward from the transmission casing 7 so as to be drivingly connected to various work machines connected to the working vehicle 1. In the transmission casing 7, a diametrically small gear 9 fixed on PTO clutch output shaft 11 and a diametrically large gear 10 fixed on PTO shaft 12 mesh with each other so as to constitute a PTO deceleration gear train 13. Therefore, as long as the output shaft 4 of the prime mover 2 is rotated at a constant speed, the PTO shaft 12 is rotated at a constant speed by the prime mover power only depending on the clutch-operation of the PTO clutch 8 regardless of speed-change performance of a traveling speed change system.

The transmission apparatus 3 includes the traveling speed change system as well as the PTO drive train including the PTO clutch 8 and the PTO deceleration gear train 13. The traveling speed change system includes preliminary transmission 14, the reverser 15, a main transmission 16, and a sub transmission 17, so as to transmit the rotary power of the input shaft 6 to a sub speed change output shaft 18 (a final output shaft of the traveling speed change system) at various speed ratios in either forward or backward traveling directions.

In an inner chamber of the transmission casing 7 behind the third chamber 51, a differential gear unit 26 is disposed so as to differentially connect left and right differential output shafts 22 to each other, and to transmit the rotary force of the sub speed change output shaft 18, i.e., the output power of the traveling speed change system, to the left and right differential output shafts 22. The differential gear unit 26 includes a bevel bull gear 20, a differential cage 21, a differential pinion assembly 25 disposed in the differential cage 21, and a pair of left and right differential side gears 23 fixed on proximal ends of the respective left and right differential output shafts 22. The bevel bull gear 20, serving as an input gear of the differential gear unit 26, is fixed on the differential cage 21 and meshes with a bevel final pinion 19 fixed on a rear end of the sub speed change output shaft 18. In the differential cage 21, the differential pinion assembly 25 includes symmetric differential pinions 24 pivoted on bull gear 20, and each differential pinion 24 meshes with both of the left and right differential side gears 23.

The transmission casing 7 supports respective axles 28 of left and right drive wheels 29, and the left and right axles 28 are drivingly connected to the respective left and right differential output shafts 22 through respective final deceleration planetary gear units 27.

A boss portion of differential cage 21 on one of the differential output shafts 22 is axially slidably provided thereon with a differential lock member 30. The differential lock member 30 includes a differential lock clutch 32 which is selectively engageable or disengageable with and from the corresponding differential side gear 23. When the differential lock clutch 32 is engaged with the corresponding differential side gear 23, the corresponding differential output shaft 22 is locked to the differential cage 21 so as to cancel the differential rotatability of the differential output shafts 22. The differential lock member 30 is provided with an annular fork groove 31 into which a fork operatively connected to a differential lock operation device such as a lever or a pedal is fitted for slide operation of the differential lock member 30.

Figure 2:
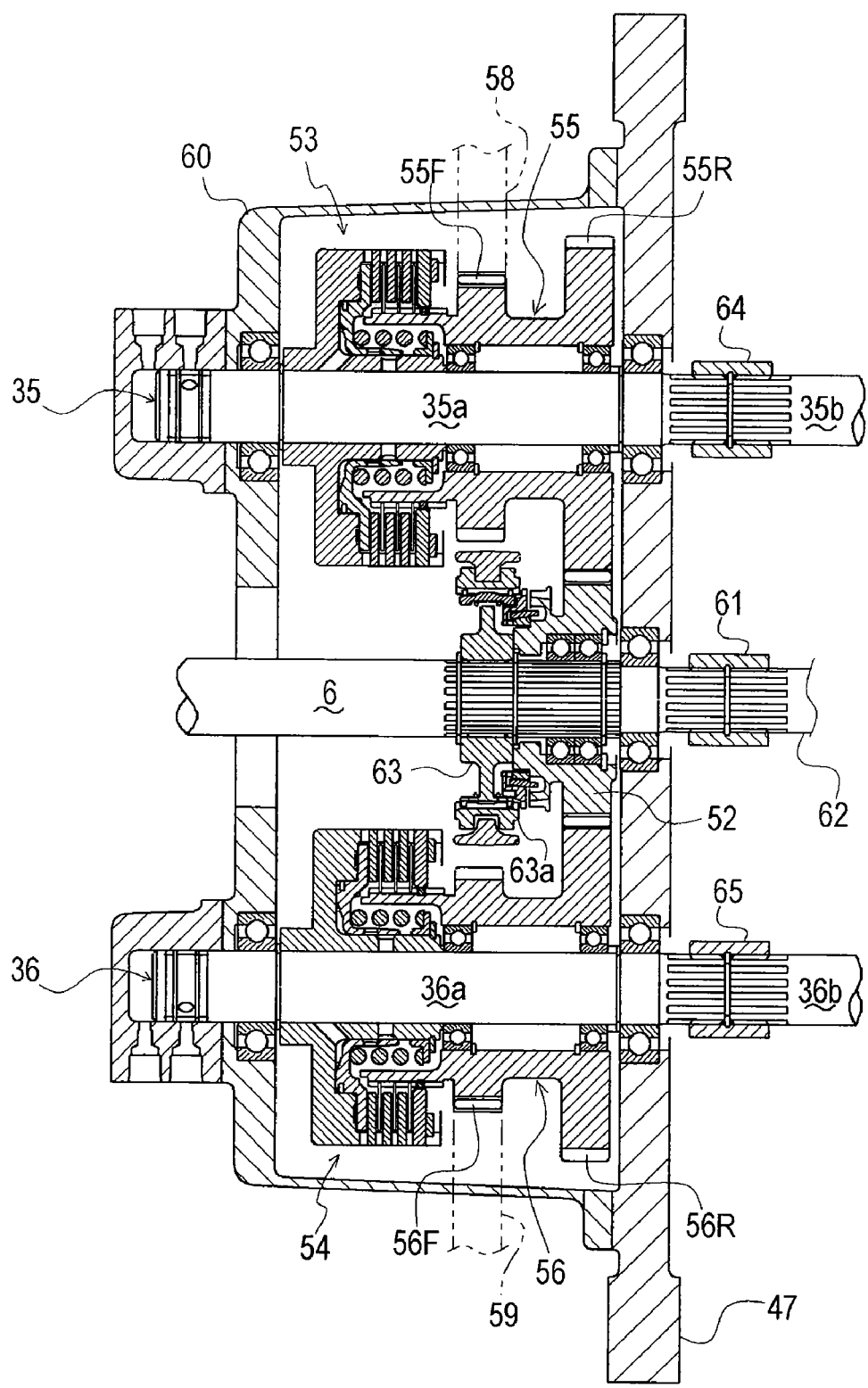
FIG. 2 is a side view partly in section of a clutch housing incorporating first and second clutches of a main transmission.
Figure 3:
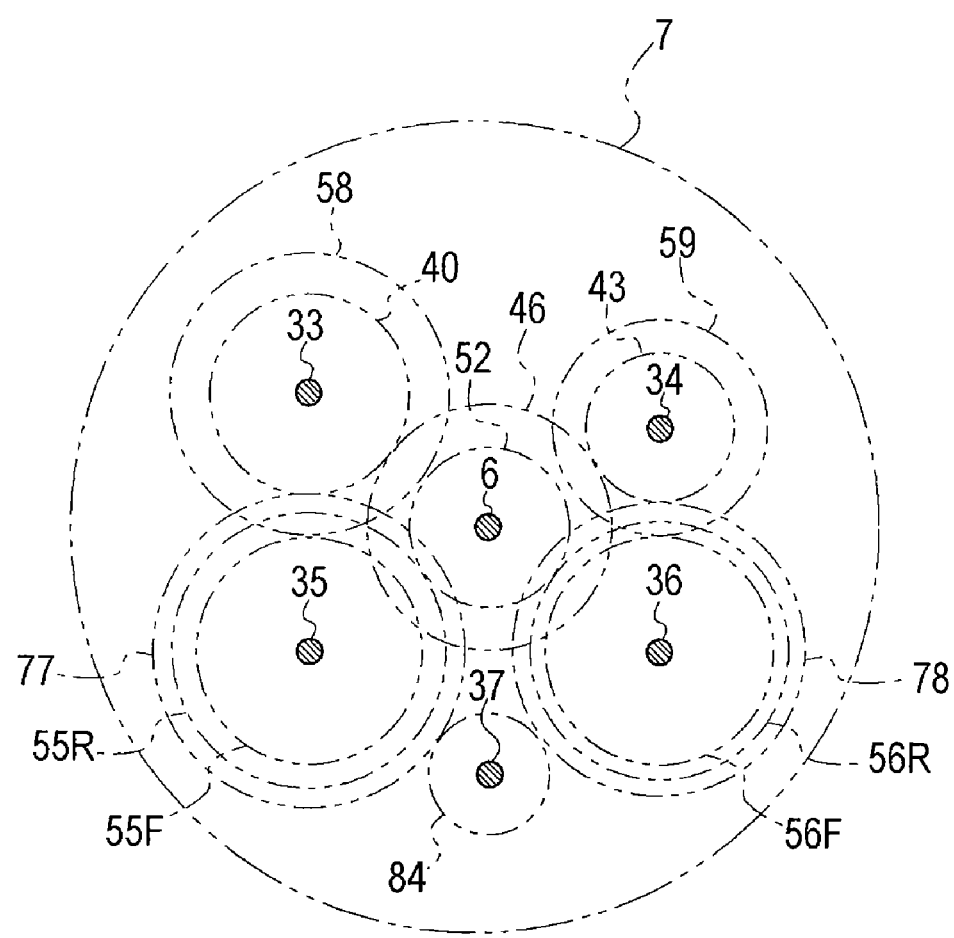
FIG. 3 is a schematic front view of an arrangement of transmission shafts.

The stricture of a traveling speed change system of a transmission apparatus 3 will be detailed in accordance with FIGS. 1 to 3. As shown in FIG. 1 and others, in the transmission casing 7, the traveling speed change system includes transmission shafts, i.e., a first preliminary speed change output shaft 33, a second preliminary speed change output shaft 34, a first main speed change input shaft 35, a second main speed change input shaft 36, a main speed change output shaft 37, and a sub speed change shaft 38. These transmission shafts 33, 34, 35, 36 and 37 are fore-and-aft extended in parallel to the input shaft 6 and the sub speed change output shaft 18.

The preliminary transmission 14 in the first chamber 49 of the transmission casing 7 will be described. A first low speed driven gear 39 and a first high speed driven gear 40 are relatively rotatably provided on a front portion of the first preliminary speed change output shaft 33. Similarly, a second low speed driven gear 42 and a second high speed driven gear 43 are relatively rotatably provided on a front portion of the second preliminary speed change output shaft 34. The first low speed driven gear 39 and the second low speed driven gear 42 mesh with a low speed driving gear 45 fixed on the input shaft 6. The first high speed driven gear 40 and the second high speed driven gear 43 mesh with a high speed driving gear 46 fixed on the input shaft 6. Accordingly, in the preliminary transmission 14, four preliminary speed change gear trains are formed between the input shaft 6 and the first and second preliminary speed change output shafts 33 and 34. In detail, a first low speed gear train, including the gears 39 and 45, and a first high speed gear train, including the gears 40 and 46, are interposed between the input shaft 6 and the first preliminary speed change output shaft 33. A second low speed gear train, including the gears 42 and 45, and a second low speed gear train, including the gears 43 and 46, are interposed between the input shaft 6 and the second preliminary speed change output shaft 34.

A spline hub 41 is fixed on the first preliminary speed change output shaft 33 between the first low speed driven gear 39 and the first high speed driven gear 40. A shifter 41a is axially slidably and relatively unrotatably engaged on the spline hub 41. Clutch-toothed portions are formed on the first low speed driven gear 39 and the first high speed driven gear 40 so as to face the spline hub 41 therebetween. Similarly, a spline hub 44 is fixed on the second preliminary speed change output shaft 34 between the second low speed driven gear 42 and the second high speed driven gear 43. A shifter 44a is axially slidably and relatively unrotatably engaged on the spline hub 44. Clutch-toothed portions are formed on the second low speed driven gear 42 and the second high speed driven gear 43 so as to face the spline hub 41 therebetween.

The shifters 41a and 44a of the preliminary transmission 14 are collar-type shifters having no synchromeshing structure, or synchromeshing type shifters, for example.

The shifters 41a and 44a are operatively locked to each other so that the shifters 41a and 44a are adapted to simultaneously mesh with the respective driven gears 39 and 42, to simultaneously mesh with the respective driven gears 40 and 43, or to simultaneously mesh with none of the gears 39, 40, 42 and 43. In this way, the preliminary transmission 14 is selectively set to one of three preliminary transmission stages: a preliminary low speed stage where the shifters 41a and 44a simultaneously mesh with the respective low speed driven gears 39 and 42; a preliminary high speed stage where the shifters 41a and 44a simultaneously mesh with the respective high speed driven gears 40 and 43; and a neutral stage where the shifters 41a and 44a are simultaneously separated from all the drive gears 39, 40, 42 and 43. As a result, the preliminary transmission 14 has low and high speed stages for forward-driving of vehicle 1, such that either the low speed stage or the high speed stage is selected to transmit the prime mover power to the main transmission 16.

The reverser 15 and a portion of the main transmission 16 disposed in the first chamber 49 will be described in accordance with FIGS. 1 and 2. The main transmission 16 includes later-discussed eight main speed gear trains disposed in the second chamber 50, and includes first and second clutches 53 and 54 disposed in the first chamber 49. The first clutch 53 and second clutch 54 are hydraulic multi-friction disc type clutches, for example. In this regard, in the first chamber 49, as shown in FIG. 2, a clutch housing 60 is fixed to the partition wall 47 and is expanded forward from the partition wall 47, so as to incorporate the reverser 15 and the first and second clutches 53 and 54 of the main transmission 16.

Referring to FIG. 2, a front shaft portion 35a of the first main speed change shaft 35 and a front shaft portion 36a of the second main speed change shaft 36 are extended fore-and-aft in the clutch housing 60, and are journalled at front ends thereof by a front wall of the clutch housing 60 and at rear ends thereof by the partition wall 47. The rear end of the front shaft portion 35a is extended rearward from the partition wall 47, and is rotatably integrally connected to a coaxial rear shaft portion 35b through a spline collar 64 in the second chamber 50, so that the coaxially connected front and rear shaft portions 35a and 35b serve as the first main speed change shaft 35. Similarly, the rear end of the front shaft portion 36a is extended rearward from the partition wall 47, and is rotatably integrally connected to a coaxial rear shaft portion 36b through a spline collar 65 in the second chamber 50, so that the coaxially connected front and rear shaft portions 36a and 36b serve as the second main speed change shaft 36. Further, the input shaft 6 is extended fore-and-aft through the clutch housing 60, and is journalled at the rear end thereof by the partition wall 47. The front portion of the input shaft 6 is extended forward from the clutch housing 60 so as to serve as the input shaft of the preliminary transmission 14, as mentioned above. The rear end of the input shaft 6 is extended rearward into the second chamber 50 so as to be connected to the PTO clutch input shaft 62, as mentioned above.

In the clutch housing 60, a first clutch input gear member 55 is relatively rotatably provided on the front shaft portion 35a of the first main speed change shaft 35 so as to serve as an input side member of the first clutch 53. When the first clutch 53 is engaged, the first clutch input gear member 55 is relatively unrotatably engaged with the first main speed change shaft 35 through the engaged first clutch 53. Similarly, in the clutch housing 60, a second clutch input gear member 56 is relatively rotatably provided on the front shaft portion 36a of the second main speed change shaft 36 so as to serve as an input side member of the second clutch 54. When the second clutch 54 is engaged, the second clutch input gear member 56 is relatively unrotatably engaged with the second main speed change shaft 36 through the second clutch 54.

A forward-driving gear 55F and a backward-driving gear 55R are formed on the first clutch input gear member 55. The forward-driving gear 55F meshes with a first output gear 58 fixed on the rear portion of the first preliminary speed change output shaft 33. Similarly, a forward-driving gear 56F and a backward-driving gear 56R are formed on the second input gear member 56. The forward driving gear part 56F meshes with a second output gear 59 fixed on the rear portion of the second preliminary speed change output shaft 34. In this way, a first forward-driving gear train (first preliminary speed change output drive train), including the gears 58 and 55F, is interposed between the first preliminary speed change output shaft 33 and the first clutch 53, so as to be drivingly connected to the first main speed change shaft 35 by engaging the first clutch 53. A second forward-driving gear train (second preliminary speed change output drive train), including the gears 59 and 56F, is interposed between the second preliminary speed change output shaft 34 and the second clutch 54, so as to be drivingly connected to the second main speed change shaft 36 by engaging the second clutch 54.

Accordingly, of the first clutch 53 and the second clutch 54, one is engaged and the other is disengaged, so that the preliminary speed-changed forward-driving power is transmitted to one of the first and second main speed change shafts 35 and 36 through the engaged first or second clutch 53 or 54 from the corresponding preliminary speed change output shaft 33 or 34.

To constitute the reverser 15, a reversing gear 52 is relatively rotatably provided on the input shaft 6 in the clutch housing 60. The reversing gear 52 meshes with the backward-driving gear 55R of the first clutch input gear member 55 and the backward-driving gear 56R of the second clutch input gear member 56. Therefore, a first backward-driving gear train, including the gears 52 and 55R is interposed between the input shaft 6 and the first main speed change shaft 35, and a second backward-driving gear train, including the gears 52 and 56R, is interposed between the input shaft 6 and the second main speed change shaft 36.

A spline hub 63 of the reverser 15 is fixed on the input shaft 6 adjacent to the reversing gear 52, and a shifter 63a is axially slidably and relatively unrotatably engaged on the spline hub 63. A clutch-toothed portion is formed on an end of the reversing gear 52 facing the spline hub 63.

Due to a later-discussed control system of electrically controlled actuators for operating shifters and clutches of the traveling speed change system of the transmission apparatus 3, the shifter 63a of the reverser 15 is operatively associated with the shifters 41a and 44a of the preliminary transmission 14, so that the preliminary transmission 14 and the reverser 15 are alternatively capable of transmitting the prime mover power to the main transmission 16. More specifically, while the reverser 15 is in a neutral position, i.e., while the shifter 63a is separated from the reversing gear 52, the shifters 41a and 44a can mesh with the gears 39 and 42 so as to establish the preliminary low speed stage (forward-driving low speed stage), and can mesh with the gears 40 and 43 so as to establish the preliminary high speed stage (forward-driving high speed stage). On the contrary, while the preliminary transmission 14 is in a neutral position, i.e., while the shifters 41a and 44a are separated from all the driven gears 39, 40, 42 and 43, the shifter 63a can mesh with the reversing gear 52 so as to establish a backward-driving stage.

In the forward-driving low speed stage, both of the first and second input gears 55 and 56 of the main transmission 16 are rotated together in the forward-driving direction at the low speed by the rotary power of the input shaft 6 through the respective low speed driven gears 39 and 42 and the respective first and second forward-driving gear trains including the gears 58 and 59. In the forward-driving high speed stage, both of the first and second input gears 55 and 56 of the main transmission 16 are rotated together in the forward-driving direction at the high speed by the rotary power of the input shaft 6 through the respective high speed driven gears 40 and 43 and the respective first and second forward-driving gear trains including the gears 58 and 59. Whether the preliminary transmission 14 is set in the forward-driving low speed stage or the forward-driving high speed stage, to establish one of later-discussed odd-numbered speed stages of the main transmission 16, the first clutch 53 is engaged and the second clutch 54 is disengaged, so that the forward-driving rotation of the first clutch input gear member 55 is transmitted to the first main speed change shaft 35 through the engaged first clutch 53. To establish one of later-discussed even-numbered speed stages of the main transmission 16, the second clutch 54 is engaged and the first clutch 53 is disengaged, so that the forward-driving rotation of the second clutch input gear member 56 is transmitted to the second main speed change shaft 36 through the engaged second clutch 54.

In the backward-driving stage, both of the first and second clutch input gear members 55 and 56 are rotated together in the backward-driving direction by the rotary power of the input shaft 6 through the reversing gear 52. To establish one of the odd-numbered speed stages of the main transmission 16, the first clutch 53 is engaged and the second clutch 54 is disengaged, so that the backward-driving rotation of the first clutch input gear member 55 is transmitted to the first main speed change shaft 35 through the engaged first clutch 53. To establish one of the even-numbered speed stages of the main transmission 16, the second clutch 54 is engaged and the first clutch 53 is disengaged, so that the backward-driving rotation of the second clutch input gear member 56 is transmitted to the second main speed change shaft 36 through the engaged second clutch 54.

Figure 5:
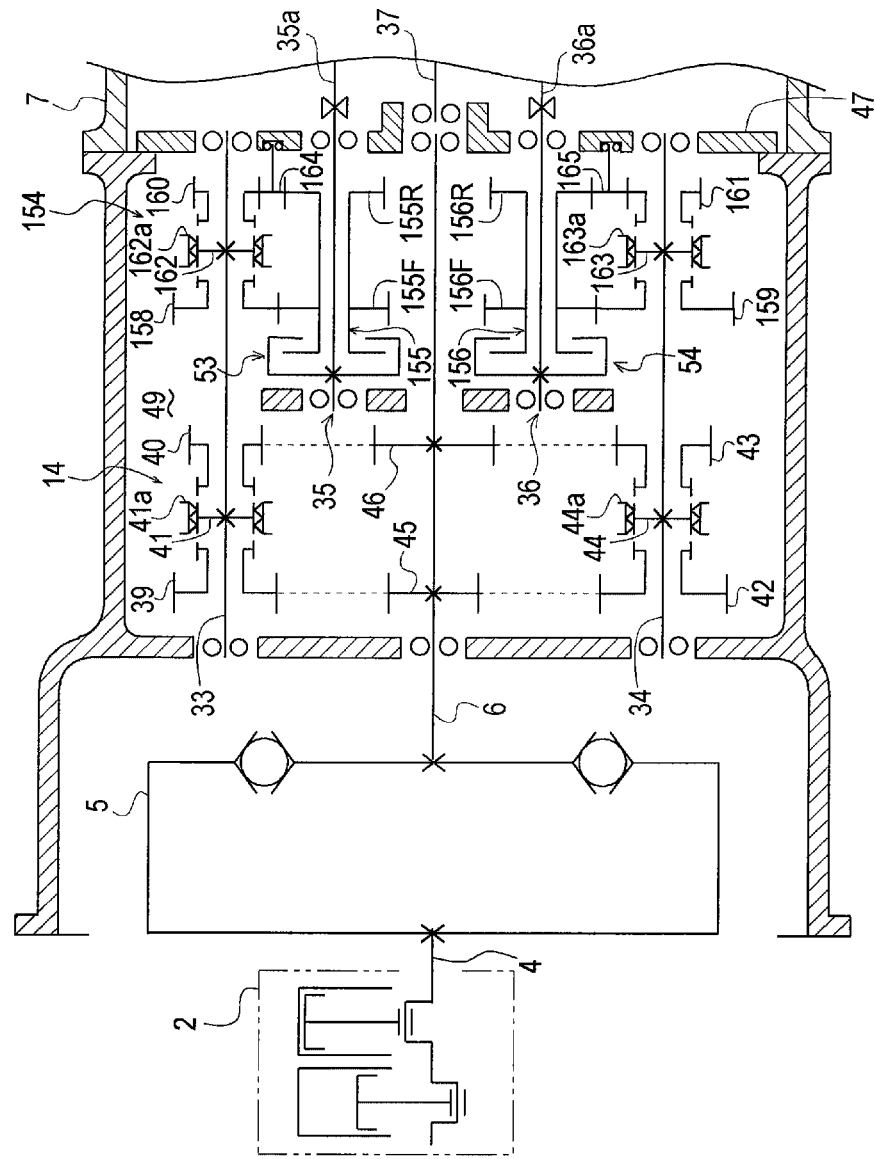
FIG. 5 is a skeleton diagram of a front portion of an alternative transmission apparatus for a working vehicle provided with an alternative reverser.

Referring to FIG. 5, an alternative reverser 154 provided on the preliminary speed change output shafts 33 and 34 will be described. In the reverser 154, a first clutch input gear sleeve 155, serving as an input member of the first clutch 53, is extended rearward from the first clutch 53 and is relatively rotatably provided on the front shaft portion 35a of the first main speed change shaft 35. When the first clutch 53 is engaged, the first clutch input gear sleeve 155 is relatively unrotatably engaged with the first main speed change shaft 35 through the engaged first clutch 53. Similarly, a second clutch input gear sleeve 156, serving as an input member of the second clutch 54, is extended rearward from the second clutch 54 and is relatively rotatably provided on the front shaft portion 36a of the second main speed change shaft 36. When the second clutch 54 is engaged, the second clutch input gear sleeve 156 is relatively unrotatably engaged with the second main speed change shaft 36 through the engaged second clutch 54. A forward-driving gear 155F and a backward-driving gear 155R are formed or fixed on the first clutch input gear sleeve 155. Similarly, a forward-driving gear 156F and a backward-driving gear 156R are formed or fixed on the second clutch input gear sleeve 156.

A distinction between the reverser 154 and the reverser 15 is that in the case of the former, a first forward-driving output gear 158 and a first backward-driving output gear 160 are relatively rotatably provided on the first preliminary speed change output shaft 33, and that a second forward-driving output gear 159 and a second backward-driving output gear 161 are relatively rotatably provided on the second preliminary speed change output shaft 34. The first forward-driving output gear 158 meshes with the forward-driving gear 155F, the second forward-driving output gear 159 meshes with the forward-driving gear 156F, the first backward-driving output gear 160 meshes with the backward-driving gear 155R through a first reversing gear 164 supported by the partition wall 47, and the second backward-driving output gear 161 meshes with the backward-driving gear part 156R through a second reversing gear 165 supported by the partition wall 47. In this way, a first forward-driving gear train, including the gears 158 and 155F, and a first backward-driving gear train, including the gears 160, 164 and 155R, are interposed between the first preliminary speed change output shaft 33 and the first main speed change shaft 35. A second forward-driving gear train, including the gears 159 and 156F, and a second backward-driving gear train, including the gears 161, 165 and 156R, are interposed between the second preliminary speed change output shaft 34 and the second main speed change shaft 36.

A spline hub 162 is fixed on the first preliminary speed change output shaft 33 between the first forward-driving output gear 158 and the first backward-driving output gear 160, and a shifter 162a is axially slidably and relatively unrotatably engaged on the spline hub 162. Similarly, a spline hub 163 is fixed on the second preliminary speed change output shaft 34 between the second forward-driving output gear 159 and the second backward-driving output gear 161, and a shifter 163a is axially slidably and relatively unrotatably engaged on the spline hub 163.

The shifters 162a and 163a are operatively locked to each other so that the shifters 162a and 163a are adapted to simultaneously mesh with the respective forward-driving output gears 158 and 159, to simultaneously mesh with the respective backward-driving gears 160 and 161, or to simultaneously mesh with none of the gears 158, 159, 160 and 161. In this way, the reverser 154 is selectively set to one of three reverser stages: a forward-driving stage where the shifters 162a and 163a simultaneously mesh with the respective forward-driving output gears 158 and 159; a backward-driving stage where the shifters 162a and 163a simultaneously mesh with the respective backward-driving output gears 160 and 161; and a reverser neutral stage where the shifters 162a and 163a are simultaneously separated from all of the gears 158, 159, 160 and 161. As a result, the preliminary transmission 14 has low and high speed stages for each of forward-driving and backward-driving of vehicle 1, such that either the low speed stage or the high speed stage is selected to transmit the prime mover power to the main transmission 16.

The above-mentioned reverser 15 is interposed between the input shaft 6 and the main transmission 16 in parallel to the preliminary transmission 14 so that the preliminary transmission 14 and the reverser 15 are alternatively capable of transmitting the prime mover power to the main transmission 16. Consequently, the multistage speed change effect due to the preliminary transmission 14 (between the preliminary low speed stage and the preliminary high speed stage) occurs only when the forward-driving stage is established by separating the shifter 63a of the reverser 15 from the reversing gear 52. When the backward-driving stage is established by engaging the shifter 63a of the reverser 15 with the reversing gear 52, only one speed stage is provided to the rotary power to be inputted to the main transmission 16.

In comparison with the reverser 15, the reverser 154 shown in FIG. 5 is interposed between the preliminary transmission 14 and the main transmission 16 so as to transmit the output power of the preliminary transmission 14 to the main transmission 16 through one of the forward-driving and backward-driving gear trains. Accordingly, not only in the forward-driving stage but also in the backward-driving stage, the multistage speed change effect due to the preliminary transmission 14 (between the preliminary low speed stage and the preliminary high speed stage) occurs.

The main transmission 16 will be described. In the second chamber 50, the rear shaft portion 35b of the first main speed change shaft 35 is relatively rotatably provided thereon with a first speed driving gear 71, a third speed driving gear 73, a fifth speed driving gear 75 and a seventh speed driving gear 77. Similarly, in the second chamber 50, the rear shaft portion 36b of the second main speed change shaft 36 is relatively rotatably provided thereon with a second speed driving gear 72, a fourth speed driving gear 74, a sixth speed driving gear 76 and an eighth speed driving gear 78.

The first speed driving gear 71 and the second speed driving gear 72 mesh with a first driven gear 81. The third speed driving gear 73 and the fourth speed driving gear 74 mesh with a second driven gear 82. The fifth speed driving gear 75 and the sixth speed driving gear 76 mesh with a third driven gear 83. The seventh speed driving gear 77 and the eighth speed driving gear 78 mesh with a fourth driven gear 84. The driven gears 81, 82, 83 and 84 are fixed on the main speed change output shaft 37. Accordingly, the main transmission 16 has eight main speed change gear trains, i.e., a first speed gear train, including the gears 71 and 81, a second speed gear train, including the gears 72 and 81, a third speed gear train, including the gears 73 and 82, a fourth speed gear train, including the gears 74 and 82, a fifth speed gear train, including the gears 75 and 83, a sixth speed gear train, including the gears 76 and 83, a seventh speed gear train, including the gears 77 and 84, and an eighth speed gear train, including the gears 78 and 84. As a result, the main transmission 16 has eight speed stages, i.e., first to eighth speed stages, one of which is selected to transmit the output power of either the preliminary transmission 14 or the reverser 15 (or to transmit the output power of the reverser 154) to the sub transmission 17.

On the rear shaft portion 35b of the first main speed change shaft 35, a spline hub 91 is fixed between the first speed driving gear 71 and the third speed driving gear 73, and a spline hub 93 is fixed between the fifth speed driving gear 75 and the seventh speed driving gear 77. On the rear shaft portion 36b of the second main speed change shaft 36, a spline hub 92 is fixed between the second speed driving gear 72 and fourth speed driving gear 74, and a spline hub 94 is fixed between the sixth speed driving gear 76 and the eighth speed driving gear 78. A shifter 91a is axially slidably and relatively unrotatably engaged on the spline hub 91, a shifter 92a on the spline hub 92, a shifter 93a on the spline hub 93, and a shifter 94a on the spline hub 94.

The first and third speed driving gears 71 and 73 are formed with respective clutch-teeth on respective ends thereof facing the spline hub 91 therebetween. Similarly, clutch-teeth are formed on ends of the second and fourth speed driving gears 72 and 74 facing the spline hub 92 therebetween, on ends of the fifth and seventh speed driving gears 75 and 77 facing the spline hub 93 therebetween, and on ends of the sixth and eighth speed driving gear 76 and 78 facing the spline hub 94 therebetween.

Accordingly, to establish one of the odd-numbered speed stages of the main transmission 16, one of the shifters 91a and 93a is selectively engaged with the clutch-toothed portion of one of the first, third, fifth and seventh speed driving gears 71, 73, 75 and 77 so that the corresponding driving gear 71, 73, 75 or 77 is relatively unrotatably engaged with the first main speed change shaft 35. On the other hand, to establish one of the even-numbered speed stages of the main transmission 16, one of the shifters 92a and 94a is engaged with the clutch-toothed portion of one of the second, fourth, sixth and eighth speed driving gears 72, 74, 76 and 78 so that the corresponding driving gear 72, 74, 76 or 78 is relatively unrotatably engaged with the second main speed change shaft 36.

The rear portion of the main speed change output shaft 37 penetrates the bearing partition wall 48 and projects into the third chamber 51, and is connected to the sub transmission 17. In the sub transmission 17, a rearwardly opened cylindrical high speed shaft 66 is fixed at a front end thereof onto the rear end of the main speed change output shaft 37. The front end of the sub speed change output shaft 18 is relatively rotatably fitted forward into the high speed shaft 66. A low speed gear 67 and a creep (i.e., super low speed) gear 68 are relatively rotatably provided on the sub speed change output shaft 18.

In the third chamber 51, the sub speed change shaft 38 is disposed parallel to the sub speed change output shaft 18. A large diameter gear 85, a middle diameter gear 86 and a small diameter gear 87 are fixed on the sub speed change shaft 38. The large diameter gear 85 meshes with a gear 69 fixed on the high speed shaft 66. The middle diameter gear 86 meshes with the low speed gear 67. The small diameter gear 87 meshes with the creep gear 68 through a creeping deceleration gear mechanism 70. In this way, the sub transmission 17 includes three sub speed change drive trains, i.e., a high speed drive train, including the high speed shaft 66 adapted to directly connect the main speed change output shaft 37 to the sub speed change output shaft 18, a low speed gear train, including the gear 69, the large diameter gear 85, the middle diameter gear 86 and the low speed gear 67, and a creep gear train, including the large diameter gear 85, the small diameter gear 87, the creeping deceleration gear mechanism 70 and the creep gear 68.

On the sub speed change output shaft 18 are fixed a spline hub 88 between the high speed shaft 66 and the low speed gear 67, and a spline hub 89 between the low speed gear 67 and the creep gear 68. Shifters 88a and 89a are axially slidably and relatively unrotatably fitted on the respective spline hubs 88 and 89. On the other hand, end portions of high speed shaft 66 and low speed gear 67 facing spline hub 88 therebetween are formed as respective clutch-toothed portions. An end portion of the creep gear 68 facing the spline hub 89 is formed as a clutch-toothed portion.

In this way, either the shifter 88a or 89a is engaged with the clutch-toothed portion of one of the shaft 66 and gears 67 and 68 so as to relatively unrotatably engage the corresponding shaft 66 or gear 67 or 68 with the sub speed change output shaft 18. Accordingly, the sub transmission 17 has three speed stages, i.e., a high speed stage, a low speed stage and a creep stage, one of which is selected to transmit the rotary power of the main speed change output shaft 37 to the sub speed change output shaft 18, thereby transmitting the output power of the sub speed change output shaft 18, i.e., the final output power of the traveling speed change system to the drive wheels 29 through the differential gear unit 26, the final deceleration gear units 27 and the axles 28.

Referring to FIG. 3, a layout of the transmission shafts of the traveling speed change system will be described. The first main speed change shaft 35, the second main speed change shaft 36, the first preliminary speed change output shaft 33, the second preliminary speed change output shaft 34 and the main speed change output shaft 37 are extended fore-and-aft horizontally in parallel and are aligned substantially circularly around the input shaft 6 supporting the gears 46 and 52 and the like. The first main speed change shaft 35 supports the gears 55F, 55R, 77 and the like thereon, the second main speed change shaft 36 supports the gears 56F, 56R, 78 and the like thereon, the first preliminary speed change output shaft 33 supports the gears 40, 58 and the like thereon, the second preliminary speed change output shaft 34 supports the gears 43, 59 and the like thereon, and the main speed change output shaft 37 supports the gear 84 and the like thereon. Accordingly, the traveling speed change system of the transmission apparatus 3 is compactly housed in the transmission casing 7.

Next, explanation will be given on the actuation of the shifters and clutches for speed change operation of the main transmission 16 with reference to FIGS. 1 and 4. The shifter 91a or 93a is moved and engaged with one of the driving gears 71, 73, 75 and 77 so as to select one of the odd-numbered speed gear trains, that is, the first speed gear train (the gears 71 and 81), the third speed gear train (the gears 73 and 82), the fifth speed gear train (the gears 75 and 83), and the seventh speed gear train (the gears 77 and 84), to be drivingly connected to the first main speed change shaft 35. Similarly, the shifter 92a or 94a is moved and engaged with one of the driving gears 72, 74, 76 and 78 so as to select one of the even-numbered speed gear trains, that is, the second speed gear train (the gears 72 and 81), the fourth speed gear train (the gears 74 and 82), the sixth speed gear train (the gears 76 and 83), and the eighth speed gear train (the gears 78 and 84), to be drivingly connected to the second main speed change shaft 36.

The shifter 91a, 92a, 93a and 94a are slid by respective actuators 101, 103, 105 and 107, such as hydraulic cylinders. The actuators 101, 103, 105 and 107 are connected to respective solenoid valves 102, 104, 106 and 108 which are electronically controlled by a controller 100. A speed change command signal is issued from the controller 100 to one of the actuators 101, 103, 105 and 107 so as to slide the corresponding one of the shifter 91a, 92a, 93a and 94a, thereby selecting one of the first to eighth speed change gear trains.

The clutches 53 and 54 are operatively connected to respective actuators 109 and 111 whose activation are controlled by respective solenoid valves 110 and 112 electronically controlled by the controller 100. Based on command signals from the controller 100, the clutches 53 and 54 are actuated gradually and continuously by the actuators 109 and 111. For example, if each of the clutches 53 and 54 is a multi-friction disc type clutch, each of actuators 109 and 111 moves to gradually change the force for pressing the friction discs, thereby gradually changing the transmitted torque in the corresponding clutch 53 or 54 until the clutch 53 or 54 is completely engaged.

The speed change operation of the traveling speed change system of the transmission apparatus 3, with the shifter 91a, 92a, 93a and 94a and the clutches 53 and 54, will be explained by referring to a representative gearshift case from a forwardlow-second-low speed stage to a forward-low-third-low speed stage. The forward-low-second-low speed stage of the traveling speed change system is a driving state where the preliminary transmission 14 and the reverser 15 are set at the forward-driving low speed state (i.e., the preliminary transmission 14 is set at the preliminary low speed stage and the reverser 15 is neutral), the main transmission 16 is set at the second speed stage, and the sub transmission 17 is set at the low speed stage. The forward-low-third-low speed stage of the traveling speed change system is a driving state where the preliminary transmission 14 and the reverser 15 are set at the forward-driving low speed stage, the main transmission 16 is set at the third speed stage and the sub transmission 17 is set at the low speed stage. Thus, the gearshift from the forward-low-second-low speed stage to the forward-low-third-low speed stage means that, while the states of the preliminary transmission 14, reverser 15 and sub transmission 17 are kept, only the speed stage of the main transmission 16 is changed from the second speed stage to the third speed stage. Hereinafter, the forward-low-second-low speed stage is simply referred to as "forward second speed", and the forward-low-third-low speed stage is simply referred to as "forward third speed".

When the working vehicle 1 is stationary, the shifters 41a and 44a are engaged with the respective low speed driven gears 39 and 42 so as to establish the preliminary low speed stage of the preliminary transmission 14, the shifter 63a of the reverser 15 is disengaged from the reversing gear 52, and the sub transmission 17 is set to the low speed stage. Then, the brake pedal is released and an accelerator pedal 113 is depressed so as to increase the traveling speed of the working vehicle 1 (hereinafter, the traveling speed of the working vehicle 1 is referred to as "vehicle speed"). The main transmission 16 changes its main speed stage in correspondence to change of the vehicle speed. At the time of traveling in the forward second speed, the first clutch 53 is disengaged, the second clutch 54 is engaged and the shifter 92a is engaged with the second speed driving gear 72 so that the main speed change output shaft 37 is connected to the second main speed change shaft 36 through the gears 72 and 81 of the second speed gear train. Accordingly, the low-speed rotary power of the second preliminary speed change output shaft 34 of the preliminary transmission 14 is transmitted to the second main speed change shaft 36 through the gears 59 and 56F of the second forward-driving gear train and the engaged second clutch 54, and then it is speed-changed into the forward second speed by the gears 72 and 81 of the second speed gear train of the main transmission 16, and is transmitted from the main speed change output shaft 37 to the sub transmission 17.

When the vehicle speed is further increased, based on operation of a later-discussed main speed change lever 136a or a vehicle-speed detection signal from a vehicle speed sensor 114 attached to the sub speed change output shaft 18 or the like, the controller 100 issues an initial command signal for gearshift from the forward second speed to the forward third speed. Accordingly, while the second clutch 54 is kept engaged and the shifter 92a is kept engaged with the gear 72 so as to drivingly connect the gear 72 and 81 of the second speed gear train to the second main speed change shaft 36, the solenoid valve 102 is switched to actuate the actuator 101 so that the shifter 91a moves to engage with the gear 73 so as to drivingly connect the gears 73 and 82 of the third speed gear train to the first main speed change shaft 35. The first clutch 53 whose output side is connected to the first main speed change shaft 35 is still kept disengaged so as to isolate the first main speed change shaft 35 from the output power of the preliminary transmission 14, thereby preventing the engagement between the first main speed change shaft 35 and the third speed gear train (the gears 73 and 82) from causing excessive stress onto the transmission apparatus 3.

After considerable time has passed since the initial command signal was issued, the controller 100 then issues a new command signal to gradually disengage the second clutch 54, and to gradually engage the first clutch 53. Therefore, the solenoid valve 110 connected to the controller 100 is proportionally controlled to actuate the actuator 109 for engaging the disengaged first clutch 53. The disengagement movement of the second clutch 54 and the engagement movement of the first clutch 53 are simultaneously performed, thereby preventing any interruption of power transmission in the main transmission 16.

After a while, the second clutch 54 is completely disengaged, and the first clutch 53 is completely engaged. During the issue of the command to disengage the second clutch 54 and to engage the first clutch 53, both the driving connection of the second speed gear train (the gears 72 and 81) to the second main speed change shaft 36 and the driving connection of the third speed gear train (the gears 73 and 82) to the first main speed change shaft 35 are maintained, so that the power transmitted from the second main speed change shaft 36 to the second speed gear train is gradually reduced, and the power transmitted from the first main speed change shaft 35 to the third speed gear train is gradually increased. Consequently, the speed of the forward-driving rotary power from the second and third speed gear trains to the main speed change output shaft 37 is gradually turned from the forward second speed to the forward third speed and finally becomes the forward third speed completely without cutting the preliminary speed-changed forward-driving power off from the preliminary transmission 14.

Upon further passage of a time, the controller 101 issues a command to finish the gearshift. Therefore, while the first clutch 53 is kept engaged, the driving connection of the third speed gear train (the gears 73 and 82) to the first main speed change shaft 35 connected to the first clutch 53 is kept, and the second clutch 54 is kept disengaged, the second speed gear train (the gears 72 and 81) is disconnected from the second main speed change shaft 36 connected to the second clutch 54. In this regard, the solenoid valve 104 is shifted to move the actuator 103 so as to slide the shifter 92a away from the clutch-toothed portion of the second speed gear 72, whereby the main speed change output shaft 37 is disconnected from the second main speed change shaft 36 so as to complete the gearshift from the forward second speed to the forward third speed. The second clutch 54 is still kept disengaged so as to isolate the second main speed change shaft 36 from the preliminary speed-changed forward-driving power from the preliminary transmission 14, whereby the disconnection movement of the second speed gear train (the gears 72 and 81) from the second main speed change shaft 36 causes no excessive stress onto the transmission apparatus 3.

Regardless of whether the forward-driving rotary power or the backward-driving rotary power is transmitted from either the preliminary transmission 14 or the reverser 15 to the clutch input gear members 55 and 56 of the first and second clutches 53 and 54, other gearshifts are performed in a similar manner to the above-mentioned manner of the gearshift from the forward-low-second-low speed stage to the forward-low-third-low speed stage. In other words, the main transmission 16 includes the first clutch 53 for the odd-numbered speeds and the second clutch 54 for the even-numbered speeds. While one odd-numbered speed gear train and one even-number speed gear train are effected to drive, the engagement movement of one clutch 53 or 54 and the disengagement movement of the other clutch 53 or 54 are performed to overlap each other, thereby realizing gearshift without interrupting power transmission from the prime mover 2 to the drive wheels 29. Such a smooth gearshift is advantageous in driving operation and stability of the traveling vehicle in comparison with the gearshifting using the conventional multi-speed change mechanism which requires interruption of power transmission.

Next, explanation will be given on a control system of the transmission apparatus 3 for speed change operations with reference to FIGS. 1 and 4. With regard to the preliminary transmission 14, an actuator 115, such as a hydraulic cylinder, for moving the shifter 41a on the first preliminary speed change output shaft 33 is operably connected to a solenoid valve 116 electronically controlled by the controller 100. Similarly, an actuator 116, such as a hydraulic cylinder, for moving the shifter 44a on the second preliminary speed change output shaft 34 is operably connected to a solenoid valve 118 electronically controlled by the controller 100. A preliminary speed change lever 119a of a preliminary speed change switch 119 connected to the controller 100 is shiftable among a preliminary high speed position 120, a neutral position 121 and a preliminary low speed position 122, so as select one of the preliminary high speed stage (corresponding to the position 120), the neutral stage (corresponding to the position 121) and the preliminary low speed stage (corresponding to the position 122). When the preliminary speed change lever 119a is set at the preliminary high speed position 120, the shifters 41a and 44a are respectively engaged with the clutch-toothed portions of the high speed driven gears 40 and 43 so that the high speed forward-driving power is transmitted from the high speed driving gear 46 to the preliminary speed change output shafts 33 and 34. When the preliminary speed change lever 119a is set at the neutral position 121, the shifters 41a and 44a are not engaged with the clutch-toothed portions so that power is not transmitted to the preliminary speed change output shafts 33 and 34. When the preliminary speed change lever 119a is set at the preliminary low speed position 122, the shifters 41a and 44a are respectively engaged with the clutch-toothed portions of the low speed driven gears 39 and 42 so that the low speed forward-driving power is transmitted from the low speed driving gear 45 to the preliminary speed change output shafts 33 and 34.

With regard to the reverser 15, an actuator 123, such as a hydraulic cylinder, for moving the shifter 63a on the input shaft 6 is operably connected to a solenoid valve 124 electronically controlled by the controller 100. A reverser lever 125a of a reverser switch 125 connected to the controller 100 is shiftable between a backward-driving position 127 and a forward-driving position 128. When the reverser lever 125a is set at the backward-driving position 127, the shifter 63a is engaged with the clutch-toothed portion of the reversing gear 52 so that the backward-driving power is transmitted through the reversing gear 52 to the clutches 53 and 54. When the reverser lever 125a is set at the forward-driving position 128, the shifter 63a is disengaged from the clutch-toothed portion of the reversing gear 52 so that the forward-driving power from the input shaft 6 is transmitted through the preliminary transmission 14 to the clutches 53 and 54.

The solenoid valves 102, 104, 106, 108, 110 and 112 of the main transmission 16 are connected to the controller 100, and a main speed change switch 136 is connected to the controller 100. The main speed change lever 136a of the main speed change switch 136 is adapted to be set to one of eight speed positions, i.e., a first speed position 141, a second speed position 142, a third speed position 143, a fourth speed position 144, a fifth speed position 145, a sixth speed position 146, a seventh speed position 147 and an eighth speed position 148. When the main speed change lever 136a is moved from one speed position to another speed position, the controller 100 issues the gearshift command signal to the solenoid valves 102, 104, 106, 108, 110 and 112 so as to shift up or down from the previously presented speed to the new selected speed, whereby one of the clutches 53 and 54 is engaged and the other clutch 53 or 54 is disengaged, and one of the shifters 91a to 94a is engaged with the clutch-toothed portion of one of the gears 71 to 78 and the other of the shifters 91a and 94a are separated from the clutch-toothed portions of the other gears.

With regard to the sub transmission 17, an actuator 128, such as a hydraulic cylinder, for moving the shifter 88a is operably connected to a solenoid valve 129 electronically controlled by the controller 100, and an actuator 130, such as a hydraulic cylinder, for moving the shifter 89a is operably connected to a solenoid valve 131 electronically controlled by the controller 100. A sub speed change lever 132a of a sub speed change switch 132 connected to the controller 100 is shiftable among a high speed position 133, a low speed position 134 and a creep position 135. When the sub speed change lever 132a is set at the high speed position 133, the shifter 88a is engaged with the clutch-toothed portion of the high speed shaft 66, and the shifter 89a is disengaged from the clutch-toothed portion of the creep gear 68, so that the main speed-changed power from the main speed change output shaft 37 is directly transmitted to the sub speed change output shaft 18 without being speed-changed by gears. When the sub speed change lever 132a is set at the low speed position 134, the shifter 88a is engaged with the clutch toothed portion of the low speed gear 67 and the shifter 89a is disengaged from the clutch-toothed portion of the creep gear 68, so that the main speed-changed power from the main speed change output shaft 37 is transmitted to the sub speed change output shaft 18 while being somewhat decelerated by the low speed gear train including the gears 67 and 86. When the sub speed change lever 132a is set at the creep position 135, the shifter 88a is disengaged from the clutch-toothed portions of the high speed shaft 66 and the low speed gear 67, and the shifter 89a is engaged with the clutch toothed portion of the creep gear 68, so that the main speed-changed power from the main speed change output shaft 37 is transmitted to the sub speed change output shaft 18 while being greatly decelerated by the creep gear train, including the creep gear 68 and the creeping deceleration gear mechanism 70.

Due to the above construction, in the case of the forward traveling, when working vehicle 1 is stationary, the reverser lever 125a is set to the forward-driving position 128 so as to set the reverser 15 into the forward-driving stage (i.e., its neutral state for disengaging the shifter 68a from the gear 52). The preliminary speed change lever 119a is set to either the preliminary low speed position 122 or the preliminary high speed position 120 so as to set the preliminary transmission 14 to either the preliminary low speed stage or the preliminary high speed stage. The sub speed change lever 132a is set to one of the high speed position 133, the low speed position 134 or the creep position 135 so as to set the sub transmission 17 to one of the high speed stage, the low speed stage or the creep stage. Then, the brake pedal is released and the accelerator pedal 113 is depressed so as to start the working vehicle 1 moving forward.

During forward traveling of the vehicle, the sub speed change lever 132a is inoperable (it is operable only while the working vehicle 1 is stationary), and the main speed change lever 136a and the preliminary speed change lever 119a are operable. More specifically, as the vehicle speed is increased or decreased by changing the depression degree of the accelerator pedal 113, an operator can operate the main speed change lever 136a so as to change the main speed stage of the main transmission 16, and can operate the preliminary speed change lever 119a so as to change the preliminary speed stage of the preliminary transmission 14 while keeping the main speed stage constant or simultaneously changing the main speed stage. Therefore, during forward traveling of the working vehicle 1, the speed ratio of the traveling speed change system can be changed more precisely to correspond to the actual vehicle speed in comparison with the case where only the main speed stage can be changed during traveling of the vehicle.

In the case of backward traveling, while the working vehicle 1 is stationary, the reverser lever 125a is set to the backward-driving position 127 so as to set the reverser 15 into the backward-driving stage where the shifter 63a engages with the gear 52. The preliminary speed change lever 119a is set at the neutral position 121 so as to set the preliminary transmission 14 into the neutral stage where the shifters 41a and 44a are disengaged from all of the gears 39, 40, 42 and 43. The sub speed change lever 132a is set to one of the positions 133, 134 or 135 so as to set the sub transmission 17 into one of the high speed stage, the low speed stage or the creep stage. Then, the brake pedal is released and the accelerator pedal 113 is depressed so as to start the working vehicle 1 moving backward.

During the backward traveling of the vehicle 1 equipped with the reverser 15 shown in FIG. 1, as the vehicle speed is changed according to change of the depression degree of the accelerator pedal 113, only the main speed change lever 136a is operable for changing the main speed stage of the main transmission 16, while the preliminary speed change lever 119a is held at the neutral position 121 so as to keep the neutral state of the preliminary transmission 14. In this regard, if the transmission apparatus 3 uses the reverser 154 as shown in FIG. 5, the preliminary speed change lever 119a for shifting the preliminary speed stage of the preliminary transmission 14 is also operable during the backward traveling of the vehicle.

Figure 4:
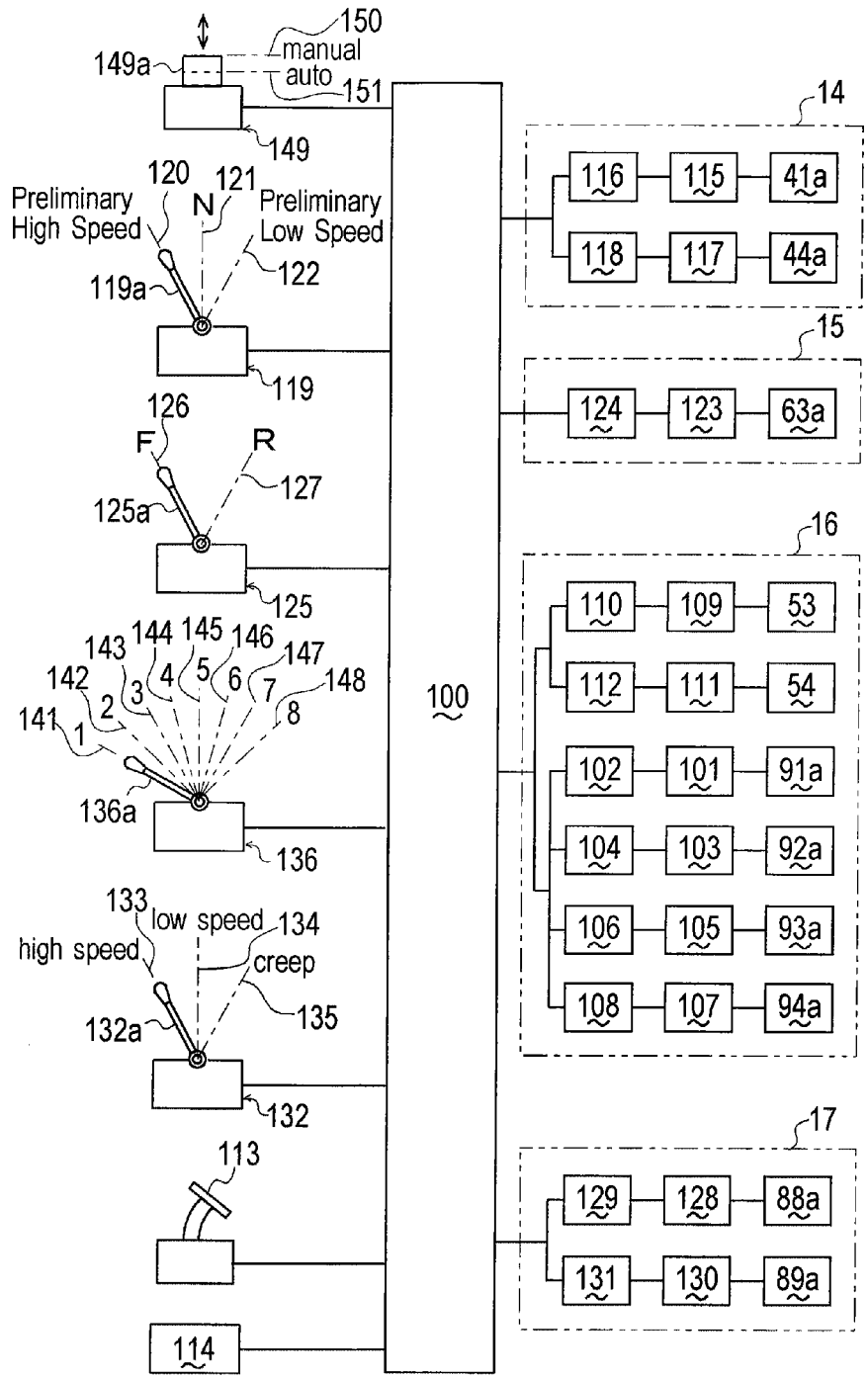
FIG. 4 is a block diagram of a control system for speed change and clutch-operation of the speed change system.

As shown in FIG. 4, an operation mode switch 149 is connected to the controller 100, and a switch button 149a for switching the operation mode switch 149 is adapted to be turned on to an auto position 151 and to be turned off to a manual position 150, so as to select one operation mode between an auto operation mode and a manual operation mode. When the auto operation mode is selected, during of the traveling of the vehicle, regardless of the set positions of the main speed change lever 136a and the preliminary speed change lever 119a, one of the eight main speed stages of the main transmission 16 and either the preliminary low or high speed stage of the preliminary transmission 14 are automatically selected to create a speed ratio of the traveling speed change system in correspondence to the actual vehicle speed which is detected by the vehicle speed sensor 114. Accordingly, during the traveling of the vehicle 1, no lever operation is required for gearshift. When the manual operation mode is selected, the gearshifts of the main transmission 16 and preliminary transmission 14 during traveling of the vehicle depends to manual operation of the main speed change lever 136a and the preliminary speed change lever 119a, as mentioned above.

Incidentally, according to the control system of FIG. 4, to set the drive wheels 29 into the neutral state, the preliminary speed change lever 119a is set at the neutral position 121 and the reverser lever 125a is set at the forward-driving position 126, so that the shifters 41a and 44a of the preliminary transmission 14 are disconnected from the gears 39, 40, 42 and 43 and the shifter 63a of the reverser 15 is disconnected from the gear 52, so as to prevent the rotary power of the input shaft 6 from being transmitted to the main transmission 16. When the vehicle 1 is set to travel forward by setting the preliminary speed change lever 119a at either the preliminary high speed position 120 or the preliminary low speed position 122 and setting the reverser lever 125a at the forward-driving position 126, the preliminary speed change lever 119a must be shifted to the neutral position 121 to establish the neutral state of the drive wheels 29. When the vehicle is set to travel backward by setting the preliminary speed change lever 119a at the neutral position 121 and setting the reverser lever 125a at the backward-driving position 127, the reverser lever 125a must be shifted to the forward-driving position 126 to establish the neutral state of the drive wheels 29. Alternatively, an additional neutral setting operation device, such as a switch, may be provided to be operated for forcibly disconnecting the shifters 41a, 44a and 63a from all of the gears 39, 40, 42, 43 and 52 regardless of the positions of the preliminary speed change lever 119a and reverser lever 125a.

Further alternatively, the neutral setting operation device may be provided for forcibly disengaging both of the first and second clutches 53 and 54, or for forcibly disconnecting the shifters 91, 92, 93 and 94 from all of the main speed gears 71, 72, 73, 74, 75, 76, 77 and 78, or for forcibly disconnecting the shifters 88a and 89a from all of the shaft 66 and gears 67 and 68 of the sub transmission 17.

It is further understood by those skilled in the art that the foregoing description is a preferred embodiment of the disclosed apparatus and that various changes and modifications may be made in the invention without departing from the spirit and scope thereof.

What is claimed is:

1. A speed change system for a working vehicle comprising:
   a main transmission receiving a prime mover power outputted from a prime mover, and having plural main speed stages, one of which is selected to transmit the prime mover power, wherein the main transmission includes a first clutch for odd-numbered main speed stages and a second clutch for even-numbered main speed stages;
   a sub transmission disposed on the downstream of the main transmission, and having plural sub speed stages, one of which is selected to transmit a power from the main transmission; and
   a preliminary transmission disposed on the upstream of the main transmission, including a forward traveling drive train, and having plural preliminary speed stages, one of which is selected to transmit the prime mover power to the main transmission via the forward traveling drive train; and
   a reverser disposed on the upstream of the main transmission so as to be switchable between a forward traveling stage and a backward traveling stage, wherein:
     the reverser includes a backward traveling drive train for transmitting the prime mover power to the main transmission,
     when the reverser is set at the forward traveling stage, the backward traveling drive train is drivingly isolated from the main transmission, and the preliminary transmission drivingly connects the forward traveling drive train to the main transmission, and
     when the reverser is set at the backward traveling stage, the backward traveling drive train is drivingly connected to the main transmission, and the preliminary transmission drivingly isolates the forward traveling drive train from the main transmission.

2. The speed change system as set forth in claim 1, wherein, when a speed-shift between one of the odd-numbered main speed stages and one of the even-numbered main speed stages is selected, one of the first and second clutches is disengaged, and the other of the first and second clutches is engaged, so that the disengagement action of the one clutch and the engagement action of the other clutch overlap each other.

3. The speed change system as set forth in claim 2, wherein:
the forward traveling drive train of the preliminary transmission includes a first preliminary output drive train drivingly connected to the first clutch and a second preliminary output drive train drivingly connected to the second clutch,
and when the reverser is set at the forward traveling stage, both of the first and second preliminary output drive trains are simultaneously driven at the selected preliminary speed stage, and the main transmission engages one of the first and second clutches so as to transmit one of the outputs of the respective first and second preliminary output drive trains to the sub transmission via the engaged first or second clutch.

4. The speed change system as set forth in claim 3, wherein:
each of the first and second preliminary output drive trains can select either of two speed stages of the plural preliminary speed stages as its output speed,
when the first preliminary output drive train selects one of its seed stages, the second preliminary output drive train selects one of its speed stages, the second preliminary output drive train selects one of its speed stages simultaneously, and
when the first preliminary output drive train selects the other of its speed stages, the second preliminary output drive train selects the other of its speed stages simultaneously.

5. The speed change system as set forth in claim 3, wherein the first and second preliminary output drive trains and the backward traveling drive train include respective shafts extended in parallel to one another.

6. The speed change system as set forth in claim 1, wherein the speed change system can be set into an auto operation mode where one of the main speed stages and one of the preliminary speed stages are automatically selected in correspondence to an actual traveling speed of the working vehicle.

7. The speed change system as set forth in claim 1, further comprising:
an input shaft for transmitting the prime mover power to the preliminary transmission; and
plural transmission shafts disposed on a power train from the preliminary transmission to the sub transmission through the main transmission,
wherein the transmission shafts aligned on a substantial circle centered on the input shaft.

8. The speed change system as set forth in claim 1, wherein an operation for selecting one of the preliminary speed stages can be performed during traveling of the working vehicle.

* * * * *